(12) United States Patent
Han et al.

(10) Patent No.: US 10,403,021 B2
(45) Date of Patent: Sep. 3, 2019

(54) MEDIA PLAY DEVICE AND METHOD FOR ACCELERATING ANIMATION PROCESSING

(71) Applicant: KT CORPORATION, Seongnam-si, Gyeonggi-do (KR)

(72) Inventors: Sung Jae Han, Gyeonggi-do (KR); Seong In Yune, Seoul (KR); Kang Tae Lee, Goyang-si (KR)

(73) Assignee: KT Corporation, Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/658,826

(22) Filed: Jul. 25, 2017

(65) Prior Publication Data

US 2018/0025528 A1   Jan. 25, 2018

(30) Foreign Application Priority Data

Jul. 25, 2016   (KR) .................. 10-2016-0094413

(51) Int. Cl.
 *G06T 13/80*   (2011.01)
 *G06F 17/22*   (2006.01)
 *G06F 17/24*   (2006.01)
 *G06T 13/00*   (2011.01)

(52) U.S. Cl.
 CPC .......... *G06T 13/80* (2013.01); *G06F 17/2247* (2013.01); *G06F 17/24* (2013.01); *G06T 13/00* (2013.01); *G06F 17/2252* (2013.01)

(58) Field of Classification Search
 CPC ............... G06F 3/0482; G06F 3/04815; G06F 3/04842; G06F 3/04845; G06F 3/04883; G06F 17/2247; G06F 3/0485; G06F 3/04817; G06F 17/24; G06F 17/2252; G06F 17/22; G06F 2203/04806; G06F 3/0346; G06F 3/14; G06T 11/60; G06T 19/006; G06T 13/80
 See application file for complete search history.

(56) References Cited

U.S. PATENT DOCUMENTS

| | | | |
|---|---|---|---|
| 2012/0240028 A1* | 9/2012 | Pereira ................. | G06F 17/218 715/234 |
| 2013/0201194 A1* | 8/2013 | Ko ........................ | G06F 3/0487 345/473 |
| 2014/0325343 A1* | 10/2014 | Rao ....................... | G06F 17/243 715/234 |

* cited by examiner

*Primary Examiner* — Xilin Guo
(74) *Attorney, Agent, or Firm* — Hamre, Schumann, Mueller & Larson, P.C.

(57) ABSTRACT

A media playing device detects an event for an object included in a web document is detected before the event occurs, and groups objects for each event if it was to actually occur, and the event is applied to other objects temporarily replacing the grouped objects. Thus, the amount of resources required for image rendering can be significantly reduced.

19 Claims, 6 Drawing Sheets

MEDIA PLAY DEVICE AND METHOD FOR ACCELERATING ANIMATION PROCESSING

CROSS-REFERENCE TO RELATED APPLICATION

This application claims the benefit under 35 U.S.C. 119(a) of Korean Patent Application No. 10-2016-0094413 filed on Jul. 25, 2016, in the Korean Intellectual Property Office, the entire disclosures of which are incorporated herein by reference for all purposes.

TECHNICAL FIELD

The present disclosure relates to accelerating animation processing on and/or for a media device.

BACKGROUND

Internet protocol television (IPTV) refers to a bi-directional broadcast and communication service that provides video content such as movies and broadcast programs, as well as other multimedia content such as Internet search results to a television set or computing device via a high-speed Internet network connection. An IPTV user can easily search the Internet, shown on the television screen or computing device, by using a remote controller, and the user can also be provided with various contents and additional services, such as movies, home shopping, home banking, on-line games, audio files, etc., via the Internet.

Via IPTV, a user may be provided with a displayed menu of available content and services, shown on a display screen that may have animation effects applied thereon. In this regard, Korean Patent Laid-open Publication No. 2008-0069016 discloses an apparatus for a GUI widget using a layout structure and a method thereof.

In order to apply an animation effect to the displayed IPTV menu, an object to be displayed on the menu needs to be individually controlled.

SUMMARY

In view of the foregoing, the present disclosure pertains to improving, on a media playing device, animation rendering of a web object, such as an image list controlled collectively, by temporarily replacing a partial area of an original image with another object and hiding another area. For the improvements regarding animation, rendering may include accelerating animation processing. The present disclosure also relates to accelerating animation processing by dynamically inserting a script into a web browser and, thus, improving animation processing performance without modifying an original code. The present disclosure also relates to minimizing repaints and reflows caused by the movement and deformation of each rendered object, which is typically a cause of the degradation of the display of web-based content. The present disclosure further relates to displaying an object expressed as a list in a virtual reality image displayed in a head-mounted display (HMD) via animation processing using a canvas. However, problems to be solved by the present disclosure are not limited to the above-described problems. There may be other problems to be solved by the present disclosure.

According to an exemplary embodiment of the present disclosure, a media playing device may include a receiving unit configured to receive a web document from a service provider server via a web browser; a script insertion unit configured to insert an acceleration script into the web document; a monitoring unit configured to, by the acceleration script, monitor whether an event on or related to the web document; a canvas management unit configured to generate a canvas corresponding to one or more objects included in the web document if an event to the one or more objects occurs and to copy the one or more objects onto the canvas; and an output unit configured to output the canvas to which the event is applied.

According to an example, the one or more objects may include one or more images, and the event may be relevant to an animation event of the one or more images.

According to an example, the canvas management unit may be configured to extract the one or more objects that are to be visually modified if the animation event is to be played in the web document; generate a canvas corresponding to the extracted one or more objects; copy an image included in the extracted one or more objects onto the canvas; and—compress the one or more objects copied on the canvas at a predetermined compression rate.

According to an example, the output unit may be configured to, before outputting the canvas, output one or more objects to be processed in the animation event on the web browser; hide objects not to be processed in the animation from the web browser; after outputting the one or more objects to be processed in the animation event on the web browser, output the canvas instead of the one or more output objects; and play the animation onto the canvas.

According to an example, the media playing device may further include a storage unit configured to store the canvas in storage areas on the basis of the frequency of use of the one or more objects.

According to an example, the monitoring unit may be configured to monitor interaction with a user in the web document through a user interface based on, for example, whether the one or more objects included in the web document are modified.

According to an example, if the received web document is replaced with another web document or the received web document is received again, i.e., refreshed, the script insertion unit may insert the acceleration script into the replaced web document or the refreshed web document. The script insertion unit may be implemented as a plug-in of the web browser.

According to another exemplary embodiment of the present disclosure, a media playing device may include a receiving unit configured to receive a web document from a service provider server through a web browser, a script insertion unit configured to insert an acceleration script into the web document, a monitoring unit configured to monitor whether an event occurs to the web document using the acceleration script, a grouping unit configured to group one or more objects included in the web document into one or more groups if an event occurs to the one or more objects, a canvas management unit configured to generate a canvas corresponding to the one or more groups and copy objects constituting the group onto the canvas, and an output unit configured to output the event as being applied to the canvas.

According to an example, the grouping unit may group the one or more objects into one or more groups according to an object movement pattern and/or an object modification pattern based on whether or not the event occurs. The grouping unit may group objects, from among the one or more objects, that will disappear from a screen if the event occurs into a first group; and the grouping unit may group objects, from among the one or more objects, that will appear on the screen if the event occurs into a second group.

According to an example, the canvas management unit may generate the canvas corresponding to a group that has not been cached.

According to yet another example, a method performed by a media playing device that accelerates animation processing on an image inserted in a web page includes receiving a web document from a service provider server via a web browser, inserting an acceleration script into the web document, monitoring whether an event occurs to the web document using the acceleration script, generating a canvas corresponding to one or more objects included in the web document if an event occurs to the one or more objects, copying the one or more objects onto the canvas, and outputting the canvas to which the event is applied.

According to an example, before outputting the canvas, one or more objects to be processed by the event may be output on the web browser, and objects that are not to be processed by the event may be hidden from the web browser.

According to an example, the method may further include, after outputting the one or more objects to be processed by the event on the web browser, outputting the canvas instead of the output one or more objects, and playing the event on the output canvas.

According to an example, the method may further include removing the output canvas when the event is finished and outputting one or more objects corresponding to the removed canvas again.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described exemplary embodiments of the present disclosure, it is possible to provide a media playing device capable of improving animation rendering performance of a web object such as an image list controlled in group by temporarily replacing a partial area of an original image with another object and blinding the other area and a method for accelerating animation processing. It is possible to provide a media playing device capable of dynamically inserting an acceleration script into a web browser and thus improving animation processing performance without modifying an original code and a method for accelerating animation processing. It is possible to provide a media playing device capable of minimizing repaints and reflows caused by the movement and deformation of each rendered object which is a cause of the degradation of a web view and a method for accelerating animation processing. It is possible to provide a media playing device capable of effectively displaying an object expressed as a list in a virtual reality image displayed in a head-mounted display (HMD) via animation processing using a canvas and a method for accelerating animation processing.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
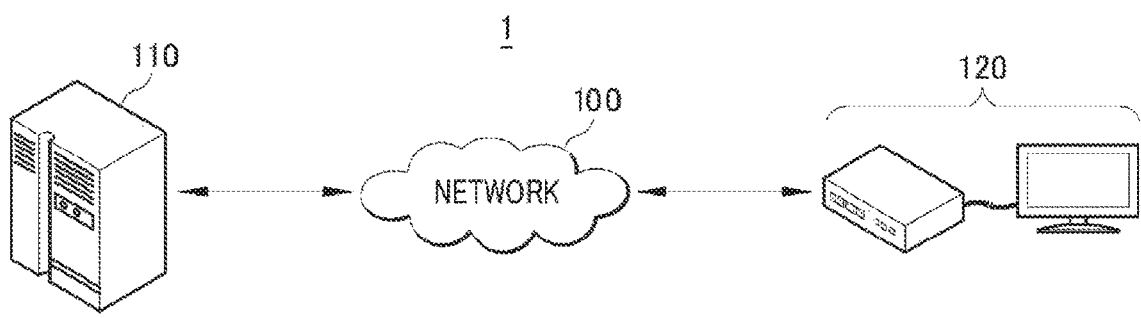
FIG. 1 shows an example configuration view of an animation accelerating system, in accordance with an embodiment of accelerating animation processing, as described herein.

Hereafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be carried out by a server connected to the terminal or device. Likewise, a part of an operation or function described as being carried out by a server may be carried out by a terminal or device connected to the server.

Hereafter, an exemplary embodiment of the present disclosure will be described in detail with reference to the accompanying drawings.

FIG. 1 shows an example configuration view of an animation accelerating system, in accordance with an embodiment of accelerating animation processing, as described herein. Referring to FIG. 1, an animation accelerating system 1 may include a service provider server 110 and a media playing device 120. The service provider server 110 and the media playing device 120 illustrated in FIG. 1 are exemplary components which can be controlled by the animation accelerating system 1.

The components of the animation accelerating system 1 illustrated in FIG. 1 are communicatively connected to each other via network 100. For example, as illustrated in FIG. 1, the media playing device 120 may be connected to the service provider server 110.

Network 100 may refer to a communication connection structure that enables information exchange between nodes such as devices and servers. Examples of network 100 may include 3G, 4G, 5G, Wi-Fi (Wireless Fidelity), Bluetooth, the Internet, LAN (Local Area Network), Wireless LAN (Wireless Local Area Network), WAN (Wide Area Network), PAN (Personal Area Network), and the like, but are not limited thereto.

Service provider server 110 may supply a media service to media playing device 120. For example, in response to media playing device 120 transmitting a request for a specific service to service provider server 110, service provider server 110 may transmit a web document, e.g., web page, to a web browser of media playing device 120.

Media playing device 120 may receive a web document, web-based application, and/or web page via the web browser from the service provider server 110. Unless context requires otherwise, reference hereafter to a web document, web-based application, and/or web page is made with the understanding that the references are interchangeable. The received web document may include source code that is readable by media playing device 120. Media playing device 120 may read the source code, and then insert an acceleration script into the received web document, web-based application, and/or web page. When the received web document is replaced with another web document or the received web document is received again, e.g., refreshed, media playing device 120 may insert the acceleration script into the re-received web document. Media playing device 120 may use a built-in plug-in of the web browser, such as a browser extension program, a browser toolbar, and a flash plug-in.

The inserted acceleration script may cause media playing device 120 to scan or review the source code corresponding to the received web document, web-based application, or web page to determine whether one or more events may be expected or anticipated to occur to, at, or, on the web document, web-based application, and/or web page, by utilizing an event listener corresponding to the acceleration script. For example, media playing device 120 may scan or review the source code corresponding to the received web document, web-based application, or web page to preview expected or anticipated interaction between a user of media playing device 120 and a web document, web-based application, and/or web page via a user interface, and thus determine whether one or more objects included in the received web document, web-based application, and/or web page are likely to be modified as a direct or indirect result of the user's interaction. The events found in the source code may be a command, activated manually or automatically, that may be preset for each object included in the web document, web-based application, and/or web page. The event may occur to, at, or, on the web document according to the direct or indirect result of the user's interaction. The event may be relevant to an animation event for one or more objects, i.e., images, and may include, for example, scrolling, zooming-in/zooming-out, 3D rotation, and the like.

Media playing device 120 may group the one or more objects into one or more groups according to an expected or anticipated object movement pattern if and/or when an event found in the source code occurs or according to an expected or anticipated object modification pattern if and/or when the event found in the source code occurs. That is, media playing device 120 may group the one or more objects based on how an object may be affected by the event if the event were to occur. For example, media playing device 120 may examine source code of a web document, web-based application, and/or web page; detect an object, e.g., image; detect events or commands that are preset to occur or affect the object upon activation of the event; and, based on predetermined or learned movement patterns of the respective objects corresponding to the event, group the objects. Further to the example, media playing device 120 may form a first group that includes those of the one or more objects that disappear from a display screen of media playing device 120 when an animation event occurs, and media playing device 120 may form a second group that includes those of the one or more objects that appear on the screen of media playing device 120 when the animation event occurs.

Media playing device 120 may generate a canvas corresponding to the one or more objects, which may include one or more images, based on an effect an expected or anticipated event may have on particular object. The canvas may be a component capable of processing an image in pixels and may be used for drawing a graphic in the web document. As a non-limiting example, a canvas may be a JavaScript tool for drawing or image processing utilizing HTML, generated by a user or automated command. Further to the example, media playing device 120 may extract one or more objects that are to be visually modified for an animation event, such as scrolling the one or more objects, zooming-in/zooming-out the one or more objects, 3D rotating the one or more objects, to be played in the web document, and may generate a canvas corresponding to the extracted one or more objects. In this case, media playing device 120 may generate a canvas corresponding to the group of extracted objects if the group has not been cached.

Media playing device 120 may then copy or draw one or more of the extracted objects onto the generated canvas. Media playing device 120 may copy images included in the extracted one or more objects onto the canvas and compress the one or more objects copied on the canvas at a predetermined compression rate.

Media playing device 120 may store the canvas in— storage areas on the basis of the frequency of use of the one or more objects. That is, the higher the frequency of use of the one or more objects, the more accessible the storage area for the corresponding canvas.

Media playing device 120 may output the canvas to which the event, e.g., animation, is applied upon actual occurrence of an expected or anticipated event based on actual interaction between a user of media playing device 120 and a web document, web-based application, and/or web page via a user interface. For example, before outputting the canvas, media playing device 120 may output one or more objects to be processed in the animation event on the web browser, and may hide or obscure objects not to be processed in the animation. Media playing device 120 may output the canvas instead of output the objects, and may apply and play the animation from the web browser.

Media playing device 120 may include a set-top box, an Internet protocol television (IPTV), a smart TV, and a connected TV.

Media playing device 120 may be as a head-mounted device (HMD) that list a specific object in a predetermined array and display a menu.

According to the embodiments presently described and contemplated herein, objects to which an event may occur are grouped and temporarily replaced with other objects in group. Thus, only a load corresponding to the number of groups is generated. Therefore, the amount of resources required for event processing may be reduced as compared to more resource-expensive implementations by which objects are individually controlled, e.g., each frame is reflowed and repainted; therefore, by the presently described and contemplated embodiments, degradation of the media playing device can be suppressed. Further, the present disclosure can also be applied to objects expressed as a list in a virtual reality image through a head-mounted device (HMD).

Further, the embodiments described and contemplated herein pertain to a technology in which an event for an object included in a web document is expected or anticipated before the event occurs, objects are grouped for each event depending on the event if it was to actually occur, and the event is applied to other objects temporarily replacing the grouped objects. Thus, the amount of resources required for image rendering may be significantly reduced.

Figure 2:
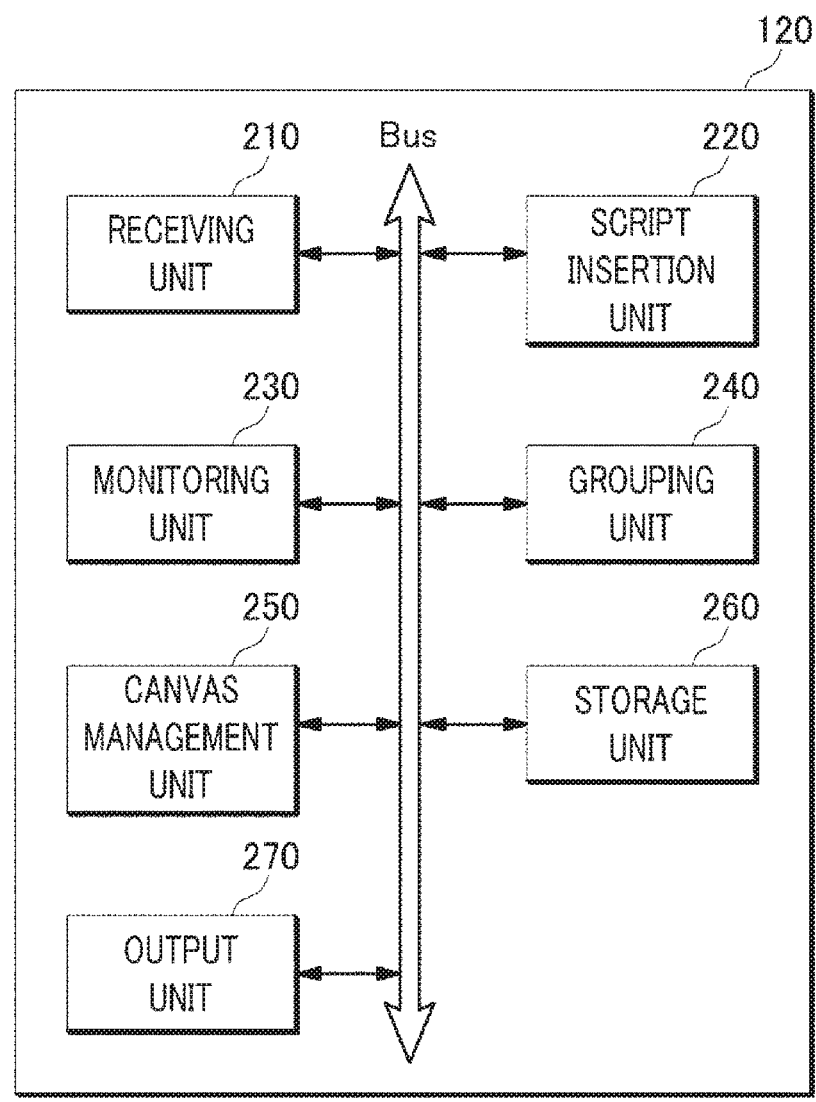
FIG. 2 shows an example configuration of a media playing device, in accordance with an embodiment of accelerating animation processing, as described herein.

FIG. 2 shows an example configuration of a media playing device, in accordance with an embodiment of accelerating animation processing, as described herein. Referring to FIG. 2, media playing device 120 may include a receiving unit 210, a script insertion unit 220, a monitoring unit 230, a grouping unit 240, a canvas management unit 250, a storage unit 260, and an output unit 270. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Receiving unit 210 may be designed, programmed, and/or configured to receive a web document, web-based application, or web page from service provider server 110 through a web browser that is open or running on media playing device 120. The received web document may include source code that is readable by media playing device 120.

Script insertion unit 220 may be designed, programmed, and/or configured to dynamically insert an acceleration script into the web document, web-based application, and/or web page received by receiving unit 210. For example, when a web document, web-based application, and/or web page is executed in the web browser, script insertion unit 220 may dynamically insert the acceleration script into the web document, web-based application, and/or web page. The acceleration script is an instantly executable script by which an event listener and basic modules are dynamically inserted into the web document, web-based application, or web page and by which an acceleration-related process is executed to, at least, detect an event. Script insertion unit 220 may be implemented as a built-in plug-in of the web browser on media playing device 120; and the built-in plug-in of the web browser may be configured as, for example, a web browser extension program, a web browser toolbar, and a flash plug-in.

When the received web document, web-based application, or web page is replaced with another version thereof or is received again, i.e., refreshed, script insertion unit 220 may insert the acceleration script into the replaced web document, web-based application, or web page or the re-received web document, web-based application, or web page.

Monitoring unit 230 may be designed, programmed, and/or configured to scan or review the source code corresponding to the received web document, web-based application, or web page to determine whether one or more events may be expected or anticipated to occur to, at, or, on the web document, web-based application, and/or web page, by utilizing an event listener corresponding to the acceleration script. Monitoring unit 230 may detect activity in the browser through event listener corresponding to the acceleration script, and when the event listener detects an event at, on or to an object including an animation element from among cascading style sheets (CSS) elements, the acceleration script may be executed. For example, monitoring unit 230 may scan or review the source code corresponding to the received web document, web-based application, or web page to preview expected or anticipated interaction between a user of media playing device 120 and a web document, web-based application, and/or web page via a user interface, and thus determine whether one or more objects included in the received web document, web-based application, and/or web page are likely to be modified as a direct or indirect result of the user's interaction. The events found in the source code may be a command, activated manually or automatically, that may be preset for each object included in the web document, web-based application, and/or web page. The event may occur to, at, or, on the web document, web-based application, and/or web page according to the direct or indirect result of the user's interaction. The event may be relevant to an animation event for one or more objects, i.e., images, and may include, for example, scrolling, zooming-in/zooming-out, 3D rotation, and the like.

Grouping unit 240 may be designed, programmed, and/or configured to group the one or more objects into one or more groups before the event occurs if monitoring unit 230 was to determine that a particular event or events are expected or anticipated to occur to, at, or on one or more objects included in the web document, web-based application, or web page. The one or more objects may include one or more images. Grouping unit 240 may group the one or more objects into one or more groups according to an object movement pattern or an object modification pattern which will be made if the event occurs, i.e., if the event was to occur.

The process of grouping one or more objects by grouping unit 240 will be described in detail with reference to FIG. 3.

Figure 3:
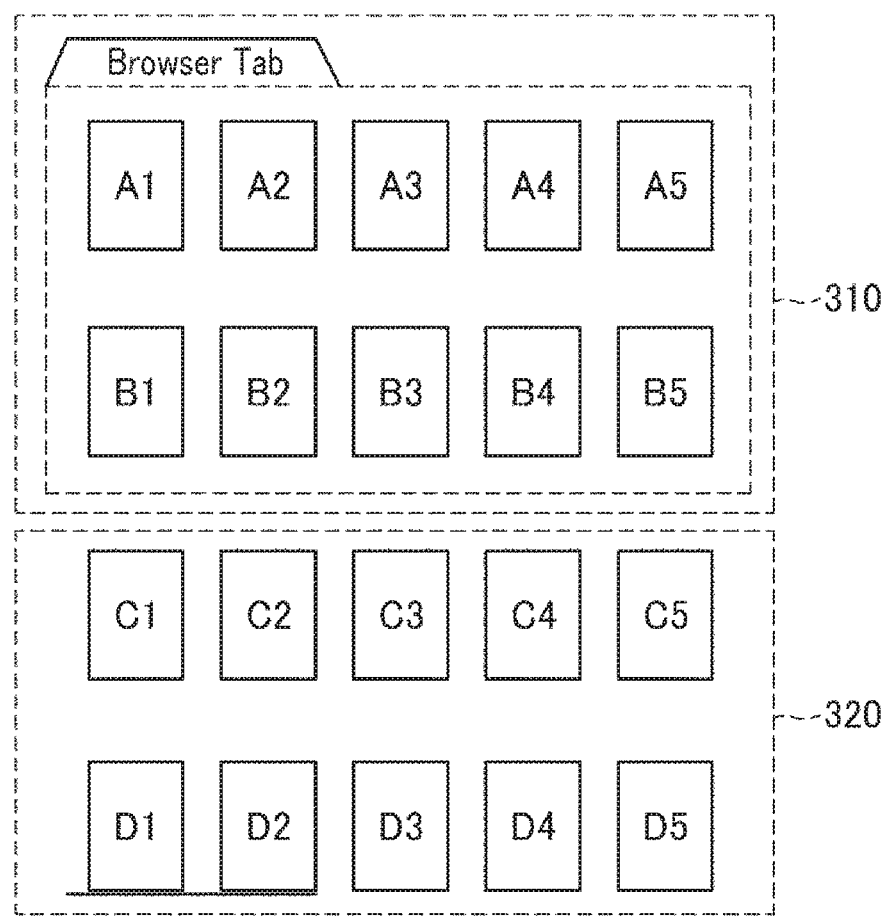
FIG. 3 shows an example of grouped objects, in accordance with an embodiment of accelerating animation processing, as described herein.

FIG. 3 shows an example of objects that are grouped in accordance with an embodiment of accelerating animation processing, as described herein. Referring to FIG. 3, grouping unit 240 may select objects that may be visually modified if an event was to occur to an object corresponding to a received web document, web-based application, or web page, and then group the objects accordingly. Specifically, the grouping unit 240 may form a first group of objects, from among the one or more objects that will disappear from a screen if the event occurs, and form a second group of objects, from among the one or more objects that will appear on the screen if the event occurs.

For example, it may be assumed that objects currently included in a row A and a row B are likely to be displayed and that the objects are likely to move upwards in response to a scrolling event. In this case, grouping unit 240 may group row A and row B to disappear into "group 1" 310 and group row C and row D to appear into "group 2" 320.

Grouping unit 240 may group objects into one or more groups depending on an expected or anticipated event, based on a determination by monitoring unit 230. Therefore, an object to which multiple events occur in an overlapping manner may be included in multiple groups in an overlapping manner.

For example, it may be assumed that objects currently included in row A and row B are likely to be displayed and that the objects would likely move upwards in response to a scrolling event and at the same time, the objects included in the row B would likely disappear when moving upwards. In this case, grouping unit 240 may group row A and row B to disappear into a group in response to an event "scroll or move upwards" and may further group the row B in response to an event "increase transparency" within the group formed in response to the event "scroll or move upwards."

That is, according to the present disclosure, grouping can be performed in anticipation of each event, and, in a single canvas generated for each event, additional grouping can be performed in response to an event according to an independent code (CSS Pseudo code and JavaScript code).

If the number of objects to be grouped is less than a predetermined threshold value, the grouping efficiency is low. Thus, grouping unit 240 may not group the objects, in the interest of processing efficiency. In this case, the grouping efficiency may vary depending on the size of an area where the grouped objects are actually displayed and the type of event.

Referring to FIG. 2 again, canvas management unit 250 may generate a canvas corresponding to the one or more objects based on an effect if an expected or anticipated particular event were to actually occur while the received web document, web-based application or web page is running, executed, viewed, played, etc. For example, canvas management unit 250 may extract one or more objects that are to be visually modified if the animation event is to be played in the web document, web-based application or web page, and may generate a canvas corresponding to the extracted one or more objects. The canvas may be a component capable of processing an image in pixels and may be used for drawing a graphic in the web document, web-based application or web page, through JavaScript. In the present disclosure, the image of an object may be copied onto the canvas.

Canvas management unit 250 may generate a canvas corresponding to a group if such a group has not already been cached. For example, canvas management unit 250 may determine whether detected groups are cached, e.g., undergoes animation processing through the acceleration script, and if there is a cached group, canvas management unit 250 may generate new canvases equal in number to the number of non-cached groups. In this case, the size and coordinates of the canvases may be set to be identical to those of the existing groups.

Canvas management unit 250 may copy one or more objects, e.g., an image, onto a canvas. In this case, canvas management unit 250 may compress the one or more objects copied on the canvas at a predetermined compression rate. Therefore, the resolution in the canvas can be reduced, and, thus, the use of a memory can be reduced.

The process of copying one or more objects onto a canvas by the canvas management unit 250 will be described in detail with reference to FIG. 4.

Figure 4:
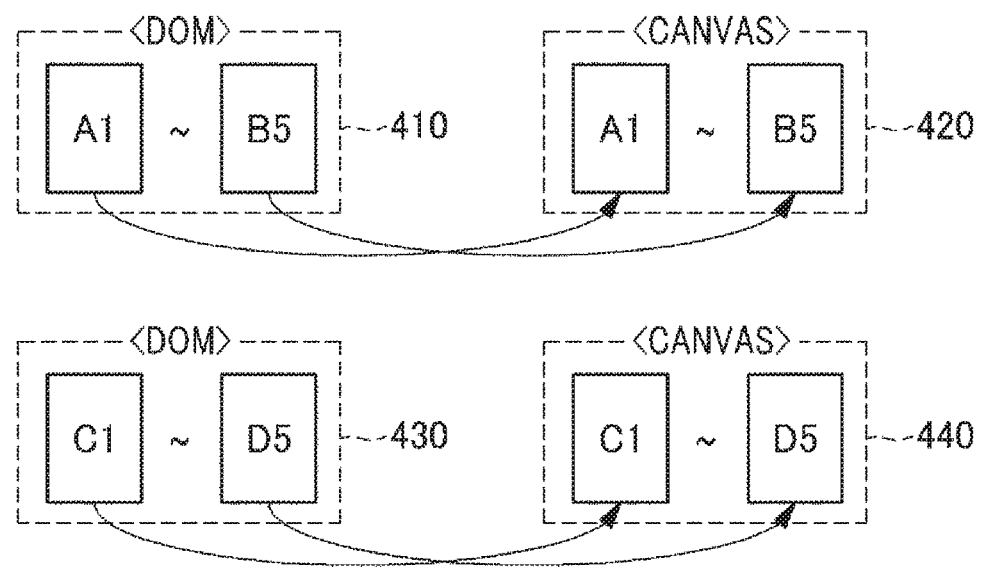
FIG. 4 shows an example of copying objects constituting a group onto a canvas, in accordance with an embodiment of accelerating animation processing, as described herein.

FIG. 4 shows an example of copying objects constituting a group onto a canvas, in accordance with an embodiment of accelerating animation processing, as described herein. Referring to FIG. 4, canvas management unit 250 may copy multiple objects constituting a group included in a document object model (DOM) onto a canvas.

For example, it may be assumed that objects are moved in response to a scrolling event. In this case, canvas management unit 250 may copy multiple objects included in row A and row B corresponding to "group 1" 310 in document object model 410 onto a first canvas 420. Further, canvas management unit 250 may copy multiple objects included in row C and row D corresponding to "group 2" 320 in document object model 430 onto a second canvas 440.

Referring to FIG. 2 again, storage unit 260 may store a canvas in various storage areas based on a frequency of use of the one or more objects, with efficient accessibility being key. For example, storage unit 260 may determine the call frequency and the frequency of use of a specific object, and store the corresponding canvas in a main memory unit, a browser cache, a file system, or the like depending on the determined call frequency and frequency of use of the specific object. Further, storage unit 260 may extract data of objects displayed on a canvas in the form of binary large object (BLOB) data and store the extracted data as a file.

Output unit 270 may output a canvas to which an event is applied. For example, output unit 270, before outputting the canvas, may output one or more objects to be processed in an animation event on the web browser, and may hide or ignore objects not to be processed in the animation. In this case, the output unit 270 may output the canvas instead of the output one or more objects, and may apply and play the animation from the web browser.

Figure 5:
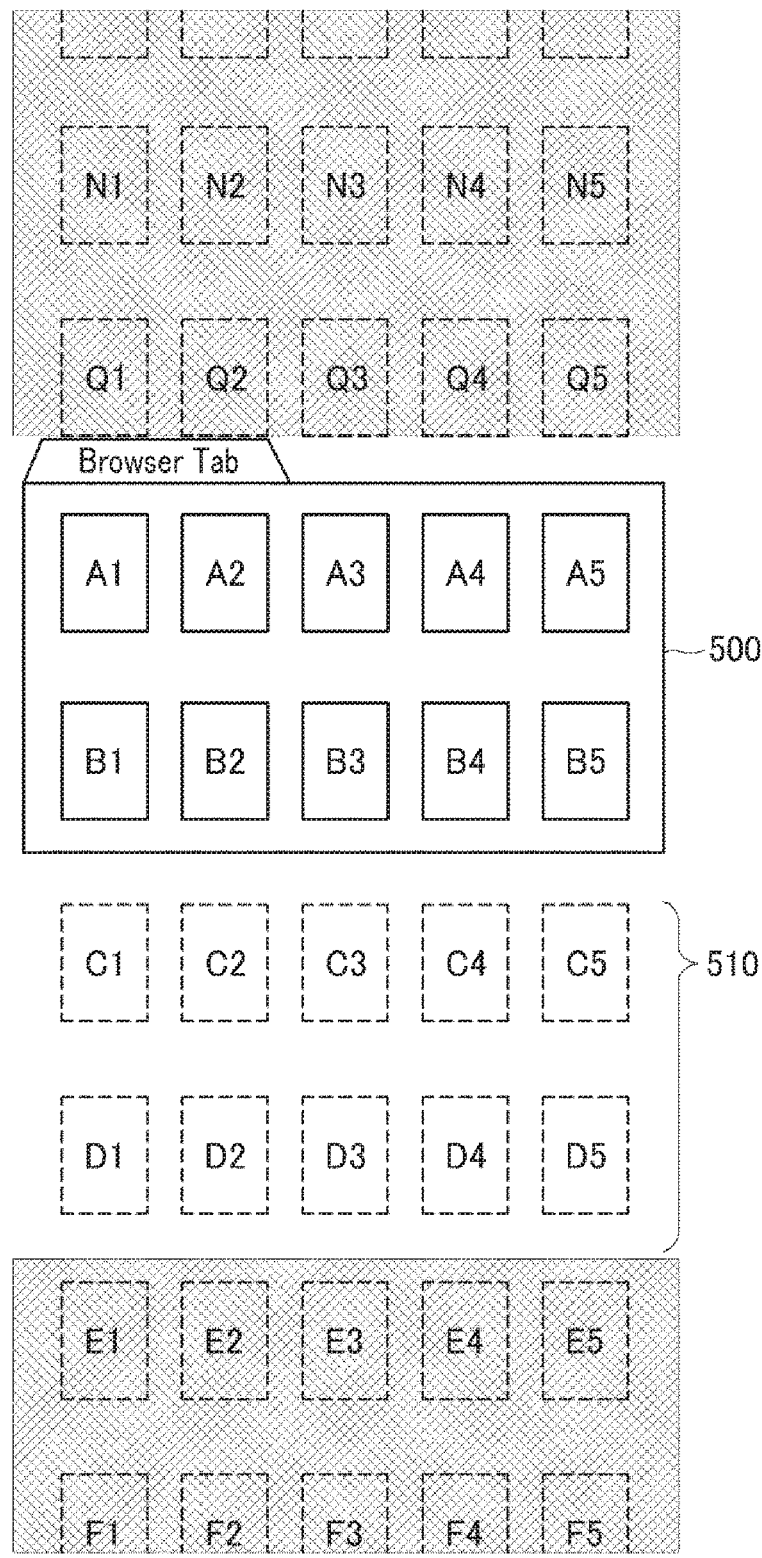
FIG. 5 shows an example of applying an event to a canvas and outputting the canvas, in accordance with an embodiment of accelerating animation processing, as described herein.

FIG. 5 shows an example of applying an event to a canvas and outputting the canvas, in accordance with an embodiment of accelerating animation processing, as described herein. Referring to FIGS. 3-5, output unit 270, before outputting the canvas, may output one or more objects to be processed in an animation event on the web browser, and may hide or ignore objects not to be processed in the animation from the web browser.

For example, it may be assumed that objects currently included in row A and row B are displayed and the objects move upwards in response to a scrolling event. Output unit 270 may hide or ignore any objects other than those corresponding to "group 1" 500 of row A and row B, cause them to disappear when moved upwards and cause objects corresponding to "group 2" 510 of row C and row D to newly appear when moved upwards.

Output unit 270 may make an original group of the DOM disappear from the display and then output a canvas including a replicated object as being inserted into a web document. Then, the canvas may be output with animation effects. That is, an image group of the object may be replaced with a single canvas.

When the output of the canvas applied with an event is completed, output unit 270 may display the original object image group of the DOM instead of the canvas and then delete the canvas from the memory. That is, according to the present disclosure, instead of objects to which an event is supposed to occur, a canvas corresponding to objects grouped in response to the event may be output and the event may be applied to the canvas. Thus, the amount of resources required for image rendering for each object can be reduced, and image rendering speed may be increased.

Figure 6:
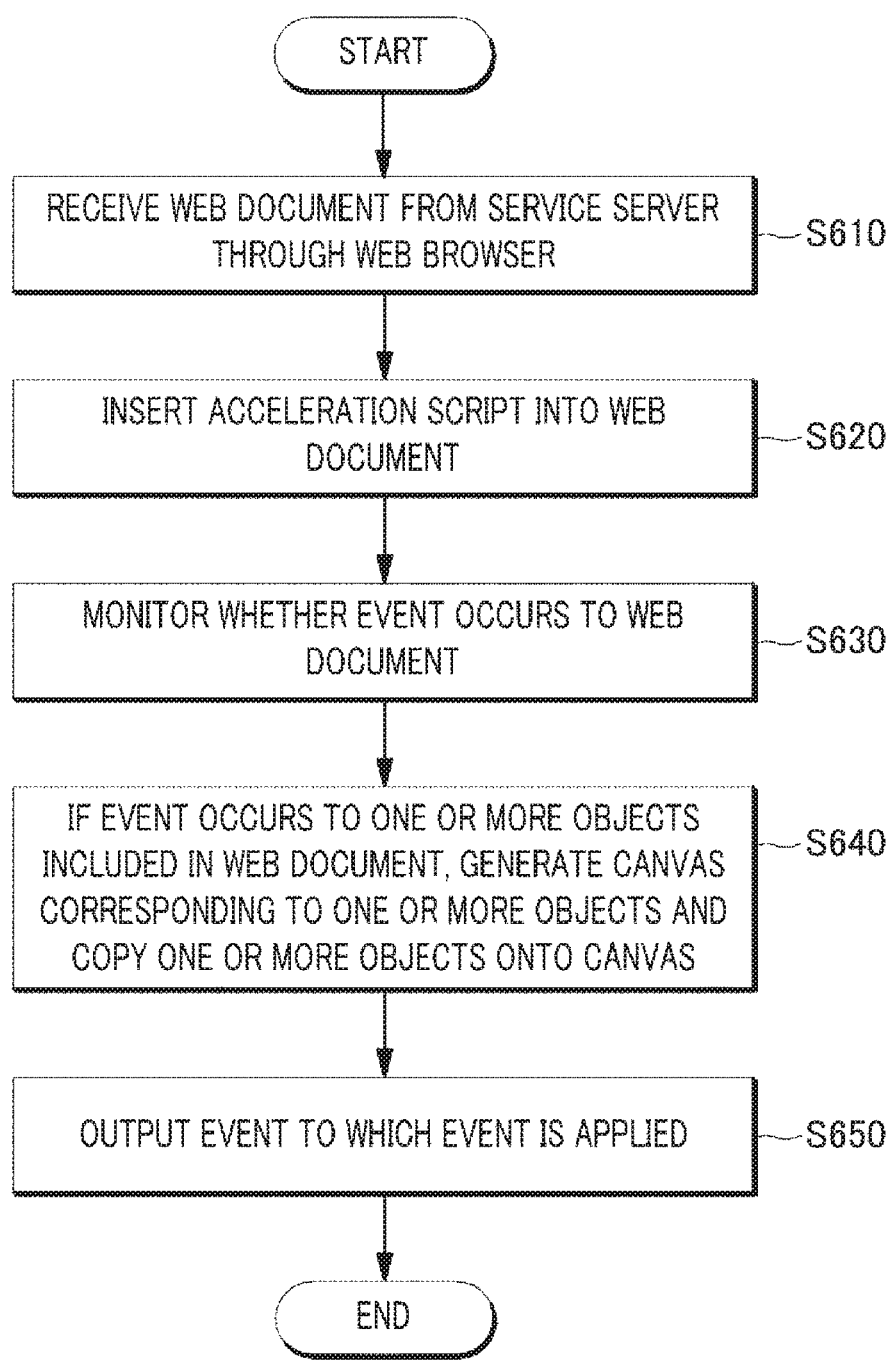
FIG. 6 shows an operation flow for accelerating animation processing of an image inserted in a web page through a media playing device, in accordance with an exemplary embodiment of accelerating animation processing, as described herein.

FIG. 6 shows an operation flow for accelerating animation processing of an image inserted in a web page through a media playing device, in accordance with an exemplary embodiment of accelerating animation processing, as described herein. The method for accelerating animation processing of an image inserted in a web page performed by the media playing device 120 in accordance with an exemplary embodiment illustrated in FIG. 6 may include processes to be performed time sequentially by the animation accelerating system 1 in accordance with the exemplary embodiment illustrated in FIG. 1 to FIG. 5. Accordingly, the descriptions of the exemplary embodiment illustrated in FIG. 1 to FIG. 5 are also applied to the method for accelerating animation processing of an image inserted in a web page performed by the media playing device 120 in accordance with the exemplary embodiment illustrated in FIG. 1 to FIG. 5 even though they are omitted hereafter.

In block S610, media playing device 120 may receive a web document from the service provider server 110 through a web browser.

In block S620, script insertion unit 220 of media playing device 120 may insert an acceleration script into the web document.

In block S630, monitoring unit 230 of media playing device 120, by the acceleration script, may monitor whether an event to the web document occurs.

In block S640, if an event occurs on, at, or to one or more objects included in the web document, canvas management unit 250 of media playing device 120 may generate a canvas corresponding to the one or more objects and copy the one or more objects onto the canvas.

In block S650, output unit 250 of media playing device 120 may output the canvas to which the event is applied.

Although not illustrated in FIG. 6, media playing device 120 may include, before outputting the canvas, outputting one or more objects to be processed by event on the web browser and blinding objects not to be processed by the event on the web document in the step of applying the event as being applied to the canvas from the web browser.

Although not illustrated in FIG. 6, media playing device 120 may further include, after outputting the one or more objects to be processed by the event on the web browser, outputting the canvas instead of the output one or more objects and playing the event onto output canvas.

Although not illustrated in FIG. 6, when the event is finished, the media playing device 120 may further include removing the output canvas and outputting the one or more objects corresponding to the removed canvas again.

In the descriptions above, blocks S610 to S650 may be divided into additional blocks or combined into fewer blocks depending on an exemplary embodiment of the present disclosure. In addition, some of the blocks may be omitted and the sequence of the blocks may be changed if necessary.

The method for accelerating animation processing of an image inserted in a web page performed by the media playing device 120 described above with reference to FIG. 1 to FIG. 6 can be implemented in a computer program stored in a medium to be executed by a computer or a storage medium including instructions codes executable by a computer. Also, the method for accelerating animation processing of an image inserted in a web page performed by the media playing device 120 described above with reference to FIG. 1 to FIG. 6 can be implemented in a computer program stored in a medium to be executed by a computer. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

110: Service provider server
120: Media playing device
210: Receiving unit
220: Script insertion unit
230: Monitoring unit
240: Grouping unit
250: Canvas management unit
260: Storage unit
270: Output unit

We claim:

1. A media playing device configured to accelerate animation processing, comprising:
    memory having stored thereon, instructions that, when executed by the media playing device, cause the media playing device to perform operations comprising:
    receiving a web document from a service provider server through a web browser;
    inserting an acceleration script into the web document;
    determining whether an event is expected to occur on the web document;
    grouping multiple objects included in the web document into a first group and a second group in anticipation of the event occurring to the multiple objects;
    generating a first canvas corresponding to the first group and a second canvas corresponding to the second group;
    copying objects constituting the first group onto the first canvas and objects constituting the second group onto the second canvas; and
    applying the event to the first canvas and second canvas and output the first canvas and second canvas on which the event is applied instead of individually applying the event to the multiple objects and individually outputting the multiple objects to which the event is applied.

2. The media playing device of claim 1, wherein the multiple objects include one or more images, and the event is relevant to an animation event for the one or more images.

3. The media playing device of claim 2, wherein the instructions cause the media playing device to perform further operations comprising:
 extracting the multiple objects that are to be visually modified if the animation event is to be played in the web document, and
 generating a canvas corresponding to the extracted multiple objects.

4. The media playing device of claim 3, wherein the instructions cause the media playing device to perform further operations, copying an image included in the extracted multiple objects onto the canvas.

5. The media playing device of claim 4, wherein the instructions cause the media playing device to perform further operations comprising:
 before outputting the canvas, outputting multiple objects to be processed in the animation event on the web browser, and
 hiding multiple objects not to be processed in the animation from the web browser.

6. The media playing device of claim 5, wherein the instructions cause the media playing device to perform further operations, after outputting the multiple objects to be processed in the animation event on the web browser, comprising:
 outputting the canvas instead of the output of the multiple objects, and
 applying and playing the animation onto the canvas.

7. The media playing device of claim 1, wherein the instructions cause the media playing device to perform further operations comprising, compressing the multiple objects copied on the first canvas and second canvas at a predetermined compression rate.

8. The media playing device of claim 1, wherein instructions cause the media playing device to perform further operations comprising, the first canvas and second canvas in various storage areas on the basis of the frequency of use of the multiple objects.

9. The media playing device of claim 1, wherein the instructions cause the media playing device to perform further operations comprising, monitoring an interaction with a user in the web document through a user interface and determining whether the multiple objects included in the web document are modified.

10. The media playing device of claim 1, the instructions cause the media playing device to perform further operations comprising, inserting the acceleration script into the replaced web document or the re-received web document, if the received web document is replaced with another web document or the received web document is received again.

11. The media playing device of claim 1, wherein the acceleration script is implemented as a plug-in of the web browser.

12. A media playing device configured to accelerate animation processing, comprising:
 memory having stored thereon, instructions that, when executed by the media playing device, cause the media playing device to perform operations comprising:
  receiving a web document from a service provider server through a web browser;
  inserting an acceleration script into the web document;
  determining whether an event is expected to occur to the web document, using the acceleration script;
  grouping multiple objects included in the web document into a first group and a second groups in anticipation of the event occurring to the multiple objects;
  generating a first canvas corresponding to the first group if the first group has not been cached, and a second canvas corresponding to the second group, wherein respective first canvas and second canvas are components capable of processing an image or drawing a graphic in the web document;
  copying objects constituting the first group onto the first canvas and objects constituting the second group onto the second canvas; and
  applying the event to the first canvas and the second canvas and output the first canvas and the second canvas on which the event is applied instead of individually applying the event to the multiple objects and individually outputting the multiple objects to which the event is applied.

13. The media playing device of claim 12, wherein the grouping of the multiple objects is performed according to an object movement pattern made if the event occurs.

14. The media playing device of claim 12, wherein the grouping of the multiple objects is performed according to an object modification pattern made if the event occurs.

15. The media playing device of claim 12, wherein the instructions cause the media playing device to perform further operations comprising:
 forming the first group of objects, from among the multiple objects, that disappear from a screen if the event occurs, and
 forming the second group of objects, from among the multiple objects, that appear on the screen if the event occurs.

16. A method performed by a media playing device and accelerates animation processing on an image inserted in a web page, the method comprising:
 receiving a web document from a service provider server through a web browser;
 inserting an acceleration script into the web document;
 determining whether an event is expected to occur to the web document;
 grouping multiple objects included in the web document into a first and a second groups in anticipation of the event occurring to the multiple objects;
 generating a first canvas corresponding to the first group, and a second canvas corresponding to the second group;
 copying objects constituting the first group onto the first canvas and objects constituting the second group onto the second canvas; and
 applying the event to the first canvas and the second canvas and outputting the first canvas and the second canvas on which the event is applied instead of individually applying the event to the multiple objects and individually outputting the multiple objects to which the event is applied.

17. The method of claim 16, wherein the outputting of the canvas includes:
 before outputting the first canvas and the second canvas, outputting multiple objects to be processed by the event on the web browser; and
 blinding multiple objects not to be processed by the event from the web browser.

18. The method of claim 17, further comprising:
 after outputting the multiple objects to be processed by the event on the web browser, outputting the first canvas and the second canvas instead of the output of the multiple objects; and
 playing the event onto the output canvas.

19. The method of claim 18, further comprising:
removing the output first canvas and the second canvas when the event is finished and outputting multiple objects corresponding to the removed canvas again.

* * * * *